Welch & Armington,
Saw Handle Connection.

N°50,667.                         Patented Oct. 24, 1865.

Witnesses:
Dr. I. Hale Jr.
G. H. Washburn.

Inventors:
Dan Welch and W. W. Armington.
by their attorney.
H. H. Eddy.

UNITED STATES PATENT OFFICE.

DAN WELCH AND WILLIAM W. ARMINGTON, OF LOWELL, MASSACHUSETTS, ASSIGNORS TO GEORGE E. MITCHELL, OF SAME PLACE.

IMPROVEMENT IN HAND-SAWS.

Specification forming part of Letters Patent No. 50,667, dated October 24, 1865.

*To all whom it may concern:*

Be it known that we, DAN WELCH and WILLIAM W. ARMINGTON, of the city of Lowell, of the county of Middlesex and State of Massachusetts, have invented an Improved Saw Blade and Handle Connection; and we do hereby declare the same to be fully described in the following specification and represented in the accompanying drawings, of which—

Figure 1:
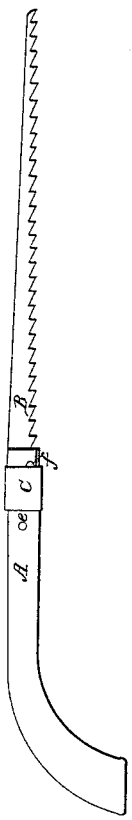
Figure 2:
Figure 3:
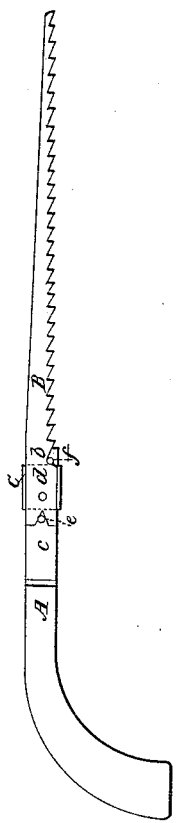

Figure 1 is a side view, Fig. 2 is a top view, and Fig. 3 a longitudinal section, of a saw blade and handle provided with my invention.

In the said drawings, A denotes the handle, and B the blade, of a saw. The shank or that part $d$ of the saw-blade which is to be inserted within the handle is formed with two angular recesses, $a\ b$, which we arranged therein in manner as represented in Fig. 3. The handle we provide with a socket or slit, $c$, for the reception of the shank $d$, and we extend through the handle and transversely through the socket $c$ two pins, $e\ f$, which we securely fasten in their places in the handle, they being arranged therein in manner as exhibited in Fig. 3. A collar or ring, $c$, is fitted to the handle, so as to circumscribe it and the shank $d$ and be capable of being slid longitudinally on and off the shank, the latter being so constructed that while the collar $c$ is in the act of being moved forward on the shank it shall press the shank closely down upon the pins $e\ f$, which are straddled by the notches $a\ b$.

Thus by means of the collar $c$, the notches $a\ b$, and the pins $e\ f$, applied to the shank and handle of the saw-blade, and arranged as specified, we are enabled to produce a connection of the blade and handle which will admit of their being readily either connected together or disconnected from each other, as circumstances may require. The said connection is also applicable to the shanks and handles of various other tools.

We claim—

The combination and arrangement of the collar $c$, the recesses $a\ b$, and the pins $e\ f$ with the socket $c$ of the handle A and with the shank $d$ of the saw-blade or tool B, the whole being substantially as and for the purpose as hereinbefore described.

DAN WELCH.
WILLIAM W. ARMINGTON.

Witnesses:
P. PENDERGAST,
WILLIAM H. ANDERSON.